United States Patent [19]
Rice et al.

[11] Patent Number: 5,724,782
[45] Date of Patent: Mar. 10, 1998

[54] SYSTEM AND METHOD FOR CONSTRUCTING BUILDINGS (AND OTHER STRUCTURES) CAPABLE OF WITHSTANDING SUBSTANTIAL NATURAL FORCES

[76] Inventors: Ronald D. Rice; Joshua W. Lavender, both of 2870 NE. 26th St., Fort Lauderdale, Fla. 33305

[21] Appl. No.: 247,905

[22] Filed: May 23, 1994

[51] Int. Cl.$^6$ ..................................................... E04B 1/00
[52] U.S. Cl. ..................... 52/745.05; 52/293.3; 52/295
[58] Field of Search ........................... 52/745.05, 293.1, 52/293.3, 295

[56] References Cited

U.S. PATENT DOCUMENTS

| | | | |
|---|---|---|---|
| 2,143,288 | 1/1939 | Stolz | 52/293.3 X |
| 2,490,537 | 12/1949 | Myer | 52/293.1 X |
| 2,595,123 | 4/1952 | Callan | 52/745.05 |
| 2,684,589 | 7/1954 | Perreton . | |
| 2,688,774 | 9/1954 | Malinowski et al. . | |
| 3,087,207 | 4/1963 | Styra . | |
| 3,292,331 | 12/1966 | Sams . | |
| 3,410,044 | 11/1968 | Moog . | |
| 3,449,878 | 6/1969 | Hem . | |
| 3,466,831 | 9/1969 | Lenoir . | |
| 3,788,020 | 1/1974 | Gregori . | |
| 3,848,376 | 11/1974 | Elmore | 52/293.1 X |
| 3,852,933 | 12/1974 | Guzzo . | |
| 3,939,618 | 2/1976 | Murphy | 52/293.3 X |
| 4,195,461 | 4/1980 | Thiis-Evensen . | |
| 4,237,670 | 12/1980 | De Waele . | |
| 4,263,762 | 4/1981 | Reed | 52/293.3 |
| 4,314,431 | 2/1982 | Rabassa . | |
| 4,373,304 | 2/1983 | Howitt | 52/293.3 X |
| 4,387,543 | 6/1983 | Tschan | 52/295 |
| 4,439,967 | 4/1984 | Dielenberg . | |
| 4,532,745 | 8/1985 | Kinard . | |
| 4,577,447 | 3/1986 | Doran . | |
| 4,755,414 | 7/1988 | Lacatus et al. . | |
| 4,860,515 | 8/1989 | Browning, Jr. . | |
| 4,894,969 | 1/1990 | Horobin . | |
| 4,916,874 | 4/1990 | McCoy et al. | 52/295 X |
| 5,014,480 | 5/1991 | Guarriello et al. . | |
| 5,048,255 | 9/1991 | Gonzales . | |
| 5,123,222 | 6/1992 | Guarriello et al. . | |

FOREIGN PATENT DOCUMENTS 8600566   10/1987   Netherlands .

*Primary Examiner*—Robert Canfield
*Assistant Examiner*—Beth Aubrey
*Attorney, Agent, or Firm*—Lyon & Lyon LLP

[57] ABSTRACT

An improved system and method for constructing buildings, or other structures, which are capable of withstanding substantial natural forces. Interlocking expanded polystyrene forms are used to create an initial shell structure. The expanded polystyrene blocks are coupled to a foundation using, for example, dual "J" tracks and stacked one on top of another to form one or more wall structures. The polystyrene blocks, when coupled together, form a plurality of hollow, interlocking, horizontal and vertical columns therebetween. These columns are adapted to receive and distribute concrete as it is poured into the wall structure. These columns are also adapted to receive and support steel reinforcing bars. Once an initial structural shell has been constructed using the polystyrene blocks, and once any required steel reinforcing bars have been properly positioned therein, concrete is pumped into the top of the wall structure. The pouring process progresses linearly and continuously along the upper surface of the wall structure filling the wall structure to a prescribed level. This process continues in a round-about or over-lapping fashion (depending upon the structure being poured) until all of the horizontal and vertical columns within the wall structure have been filled with concrete and insures that no cold joints are formed within the concrete.

5 Claims, 8 Drawing Sheets

5,724,782

SYSTEM AND METHOD FOR CONSTRUCTING BUILDINGS (AND OTHER STRUCTURES) CAPABLE OF WITHSTANDING SUBSTANTIAL NATURAL FORCES

BACKGROUND

The field of the present invention is building systems and building methods. In particular, the present invention is directed to a building system and method for use in the manufacture of buildings and other structures capable of withstanding substantial natural forces.

Recently, substantial attention has been directed to the development of systems and methods for constructing buildings (and other structures) which are substantially impervious to attack by extreme forces of nature, for example, hurricanes, earthquakes and the like. Unfortunately, few, if any, systems and methods have been developed which are both economically efficient and capable of providing the structural support necessary to withstand the natural forces present in, for example, a hurricane or earthquake.

SUMMARY OF THE INVENTION

The present invention is directed to an improved building system and method which is both economically efficient and capable of creating a structure which is capable of withstanding substantial natural forces.

In accordance with one form of the present invention, interlocking expanded polystyrene forms (often referred to herein as "PolyBLOC") are used to create an initial shell structure. The expanded polystyrene blocks are coupled to a foundation using, for example, dual "J" tracks and stacked one on top of another to form one or more wall structures. The polystyrene blocks, when coupled together, form a plurality of hollow, interlocking, horizontal and vertical columns therebetween. These columns are adapted to receive and distribute concrete as it is poured into the wall structure. These columns are also adapted to receive and support steel reinforcing bars. Once an initial structural shell has been constructed using the polystyrene blocks, and once any required steel reinforcing bars have been properly positioned therein, concrete is pumped into the top of the wall structure. The pouring process progresses linearly and continuously along the upper surface of the wall structure filling the wall structure to a prescribed level. This process continues in a round-about or overlapping fashion (depending upon the structure being poured) until all of the horizontal and vertical columns within the wall structure have been filled with concrete. It is preferred that all of the concrete disposed within the wall structure cure at the same time to insure that no cold joints (or distinct layers of cured concrete) are formed within the concrete.

By ensuring that no cold joints are formed within any of the horizontal or vertical columns of the concrete pumped into the polystyrene block shell, and by allowing all of the concrete poured within the shell to cure simultaneously, an extremely strong structure is produced.

In one preferred form, the concrete used to fill the horizontal and vertical columns within a wall structure may be 4,000 p.s.i., pee gravel, or "shot mix", having a 9" slump. However, where high strength concrete is required, 6,000–10,000 p.s.i. concrete may be utilized.

Structures constructed using the system and method of the present invention have been tested and are believed to be capable of withstanding 300+ m.p.h. winds. These or similar structures will also soon undergo substantial seismic testing.

It is an object of the present invention to provide an improved building system and method for creating structures capable of withstanding substantial natural forces (for example, hurricanes and earthquakes).

It is also an object of the present invention to provide a building system and method which is economically efficient.

It is also an object of the present invention to provide an improved building system and method which will produce structures which are resistant to insect infestation (i.e. termite infestation).

DESCRIPTION

The building system (and method) of the present invention is a fully engineered building system which utilizes expanded polystyrene stay-in-place forms and high strength concrete as core elements of a finished housing shell. The various components and the methods of the present invention develop a residential, commercial or industrial building shell which offers very high resistance to damage or failure from hurricane force winds and seismic loading.

Theoretical engineering models indicate a wind resistance loading of 440 m.p.h. for the vertical wall sections, constructed of reinforced concrete utilizing the stay-in-place forms and methods of the present invention. The roofing elements are designed and fabricated from cold rolled formed galvalum steel. This portion of the shell can be designed to resist wind loading in excess of 300 m.p.h. delivering a useful roof finish life of 50 years. The roofing element of the present invention can be fabricated and assembled on a job site or at an assembly site distant from a primary manufacturing facility.

With a properly engineered and executed monolithic slab (or traditional footer) in place the erection of the stay-in-place forms of the present invention may commence. Window, door and column floor pattern and placement layout is transferred to the slab or footer surface in a conventional fashion.

Figure 1A:
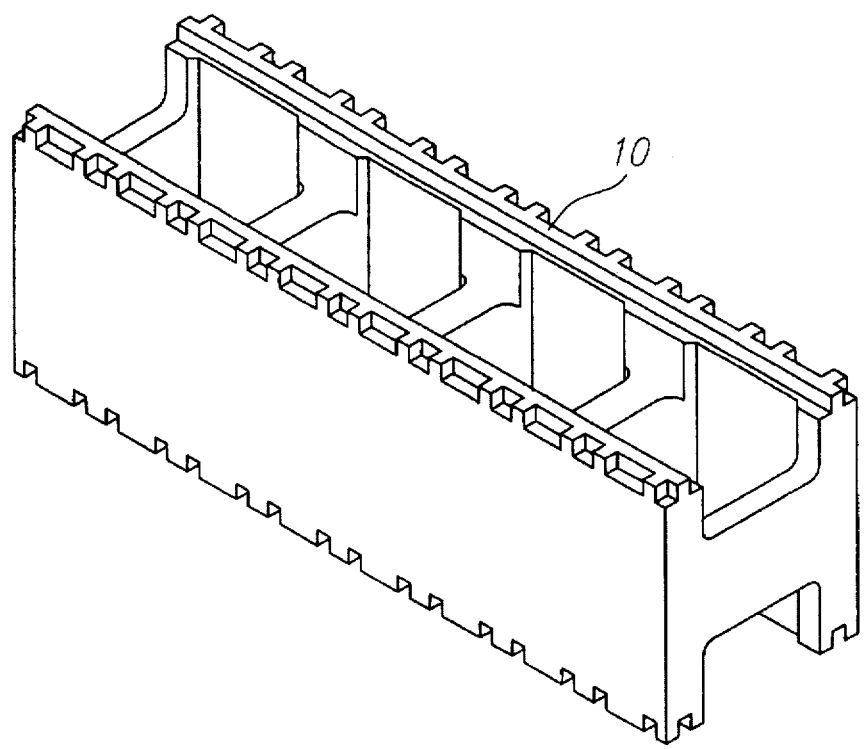
FIG. 1(a) is an illustration of a stay-in-place polystyrene form in accordance with the present invention.
Figure 1B:
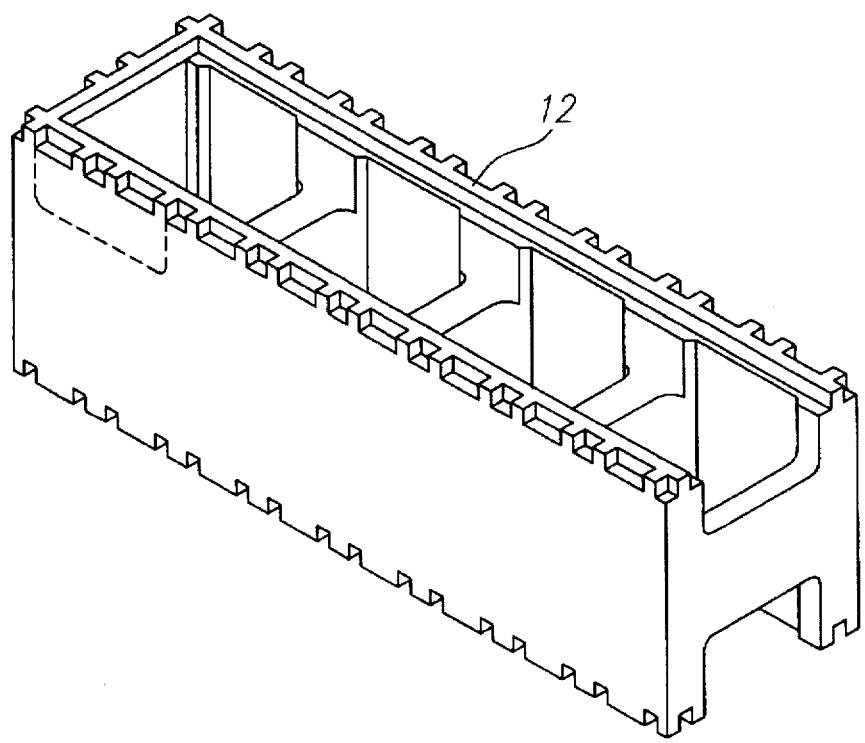
FIG. 1(b) is an illustration of an end or corner unit in accordance with the present invention.
Figure 1C:
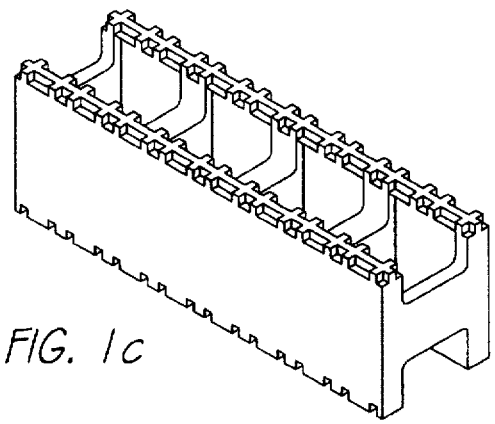
FIG. 1(c) illustrates an expanded polystyrene block form in accordance with the present invention and illustrates the dimensions of such a form.
Figure 1E:
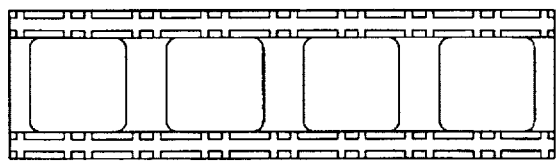
FIG. 1(e) provides a top view of the form illustrated in FIG. 1(c).
Figure 1F:
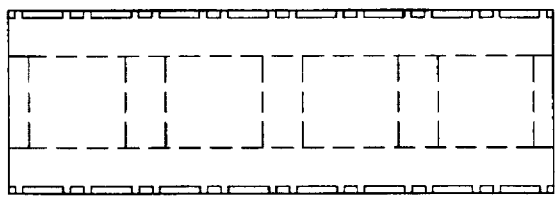
FIG. 1(f) provides a left-side view of the form illustrated in FIG. 1(c).
Figure 1D:
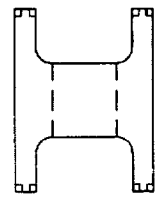
FIG. 1(d) illustrates a cross-section of the form shown in FIG. 1(c).
Figure 1G:
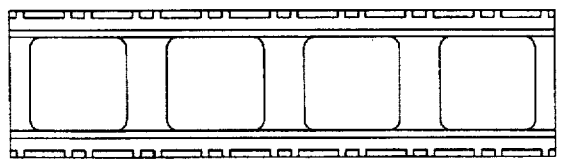
FIG. 1(g) provides a bottom view of the form illustrated in FIG. 1(c).

Turning now to the drawings, FIGS 1(a) and 1(b) illustrate two forms of an expanded polystyrene stay-in-place form which is utilized in accordance with the present invention. FIG. 1(a) illustrates a standard form 10, and FIG. 1(b) illustrates a corner form 12. It is presently preferred that the forms 10 and 12 be 40" in length, 10" in width, and 12" in height (see FIGS. 1(c)–1(h) for further illustrations and dimensions). It is also preferred that each of the forms 10 and 12 hold approximately 1.377 cubic feet of concrete. Expanded polystyrene forms of this type may be obtained from Sola Caribe, Inc., of Fort Lauderdale, Fla.

Figure 2:
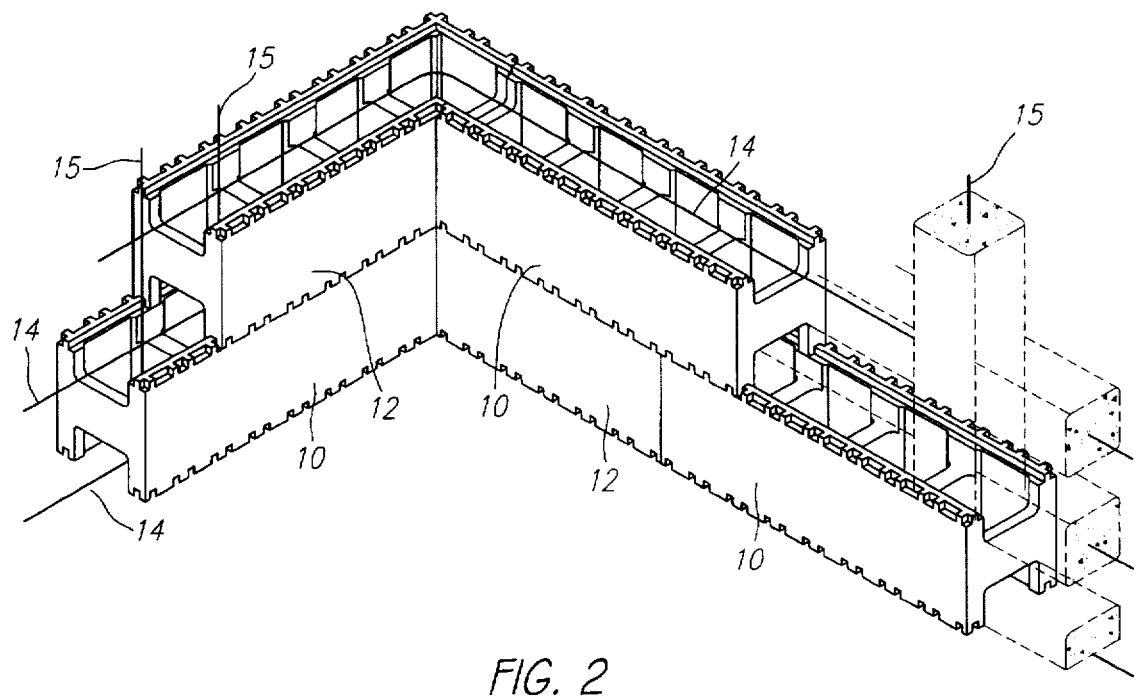
FIG. 2 is an illustration of a partial wall formed of stay-in-place forms in accordance with the present invention.

Turning now also to FIG. 2, to form an external shell of a wall or other structure, the forms 10 and 12 are stacked one on top of another in an interlocking fashion. Thus, as shown in FIG. 2, steel reinforcing bars 14 and 15 may be disposed within the shell of a wall (or other structure) as needed.

Figure 6:
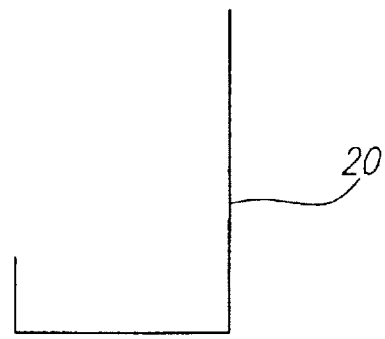
FIG. 6 provides an illustration of a section of "J" track (often referred to herein as PolyTRAC).

The construction process using the system and method of the present invention proceeds as follows. First, a dual "J" track 20 ("PolyTRAC", manufactured by Sola Caribe, Inc. of Fort Lauderdale, Fla.), such as that illustrated in FIG. 6, is attached to the outer edge of the slab (see FIG. 4). PolyTRAC, or dual "J" track 20, is a cold rolled galvalum steel profile that acts as a floor track which receives the first course (or level) of PolyBLOC. The PolyTRAC 20 keeps the stay-in-place forms 10 and 12 of the first course in position during the erection process. In addition, during the placement of concrete the dual "J" track 20 dramatically reduces the potential for "blow out" of the stay-in-place forms 10 and 12 at the bottom of the first course due to the hydrostatic pressure generated by concrete falling from as high as 12 feet.

The dual "J" track 20 also may be placed on the top course of the stay-in-place forms 10 and 12 in a reverse position (an inverted "J"). This creates a mechanical attachment surface for the addition of sheet rock or other interior/exterior surface finishes. Sheet rock may be laid out vertically, instead of in the traditional horizontal pattern, potentially eliminating 33% of the joint finishing required. At the time the "J" track installation is proceeding, a small 1"×5" prepunched galvalum metal clip is installed at 10-foot intervals between the slab and the "J" track and is anchored with the track. For future reference this clip will be described as a "J track clip". The purpose of this clip is for tie down and securing of the stay-in-place form wall prior to placement of concrete.

Figure 7:
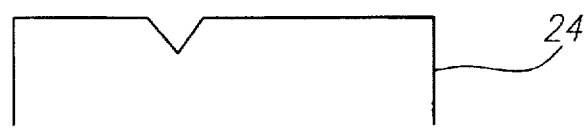
FIG. 7 provides an illustration of a wire support (often referred to herein as PolyCHAIR) for a reinforcing bar.

Turning now to FIG. 3, the erection of the multiple courses of the stay-in-place forms proceeds as follows. The courses are laid from a corner 30 to the center 32 with the less than full stay-in-place forms 16 set in the middle of the course. Corners are formed by the use of an end block 12 and run block 10. At the commencement of a course, a corner end block 12 is placed at the extreme end of the course and a run block 10 is placed perpendicular to the end block at the corner at 90 degrees.

Where the placement of horizontal reinforced steel is required the steel bar is supported by a formed wire shape structure 24 ("PolyCHAIR", illustrated in FIG. 7, and manufactured by Sola Caribe, Inc. of Fort Lauderdale, Fla.), which is inserted into the stay-in-place blocks 10 and 12 transversely to the exterior wall of the blocks 10 and 12, between the longitudinal interlocking track supports the horizontal steel bar.

At appropriate linear dimensions vertical super supporting columns are created by cutting and removing a cross-web of the stay-in-place forms 10 and 12, creating a vertical column approximately 17"×6.25" with vertical reinforced steel.

Figure 1H:
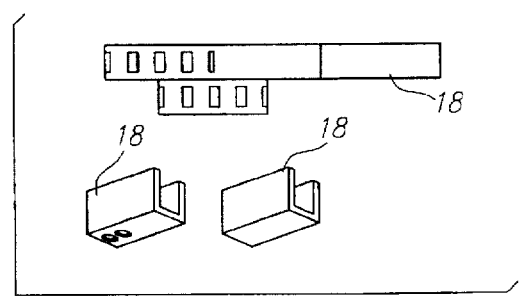
FIG. 1(h) provides an illustration of an end lintel block and a standard lintel block.

At the top course of a wall or at the top course of a wide opening (garage door, large front window area, etc.) where additional up or down load bearing support is required, a concrete beam is a developed by installing a beam block (or lintel block) 18 (shown in FIG. 1(h)). This is used in place of an end block 12 or run block 10. The beam block 18 develops a horizontal concrete beam 6.26" in width by 10" in depth by the length of the run. This volume area can accommodate large profile super reinforcing steel to meet design loading requirements.

Figure 8:
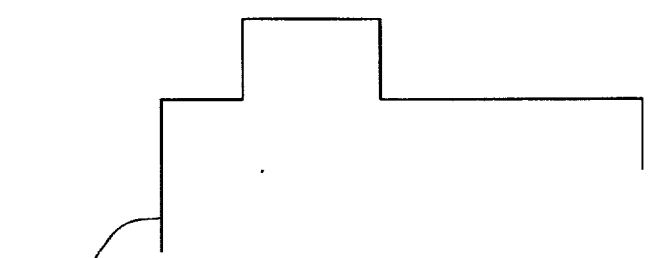
FIG. 8 provides an illustration of a mechanical fastener (often referred to herein as a PolyCLIP).

When it is determined that mechanical fastening from the poured concrete wall structure through the expanded polystyrene stay-in-place forms 10 and 12 is required a PolyCLIP 22 (manufactured by Sola Caribe, Inc. of Fort Lauderdale, Fla.), such as that shown in FIG. 8, is installed during the erection of the PolyBLOC wall in the appropriate pattern for the fastening requirements. The PolyCLIP 22 is a blanked and formed cold rolled galvalum steel profile clip which is designed to snap over the longitudinal profile of the stay-in-place forms 10, 12 and 18. The PolyCLIP 22 protrudes 2" into the interior void of the PolyBLOC 10, 12 and 18 having a 1" punched hole on the interior tab. On the outer surface the PolyCLIP 22 is formed downward on the exterior surface of the stay-inplace forms 10 and 12. An exterior tab allows for screwing, riveting or nailing of exterior finishing systems to the stay-in-place forms 10 and 12. The interior tab of PolyCLIP 22 is cast into the wet concrete and creates an embedded anchor for the load bearing requirements of the exterior finish.

When the stay-in-place form wall has been erected to its full height and the perimeter is complete, a PolyFRAME (manufactured by Sola Caribe, Inc. of Fort Lauderdale, Fla.) door or window framing system can be installed.

Figure 4:
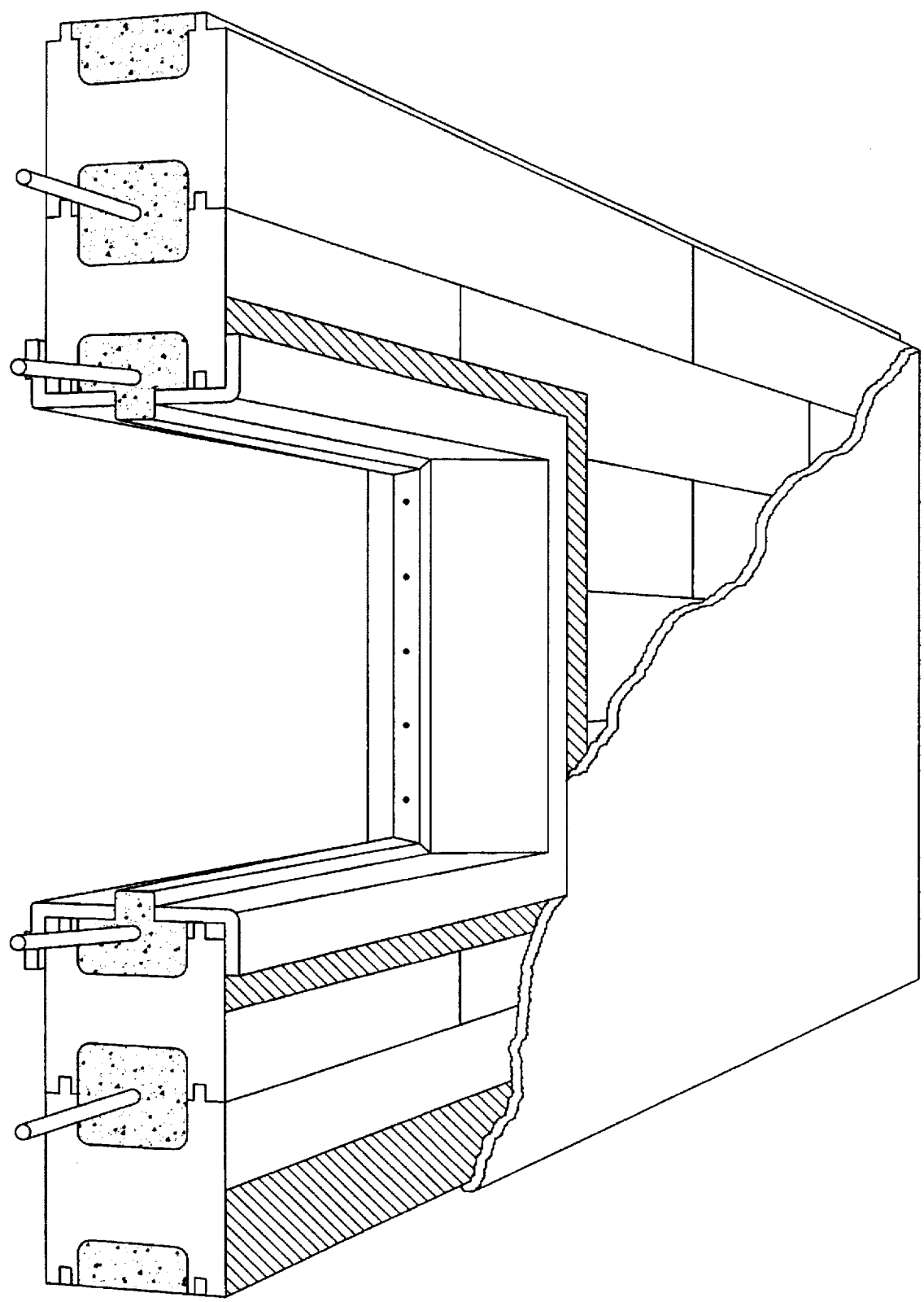
FIG. 4 shows a cross-section of a wall and window frame in accordance with the present invention.
Figure 5:
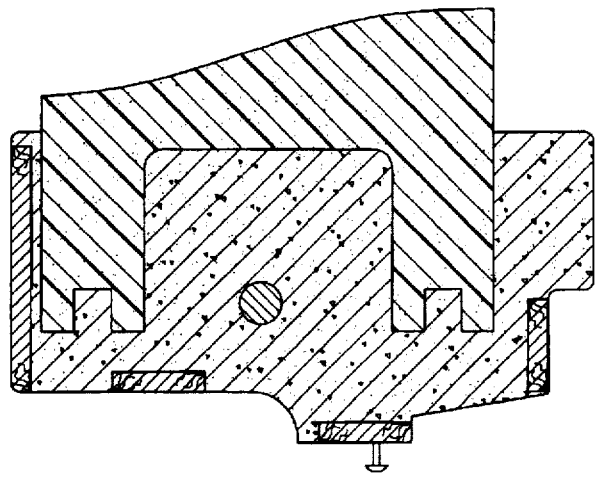
FIG. 5 shows a cross-section of a wall and window frame in accordance with another preferred form of the present invention.
Figure 5:
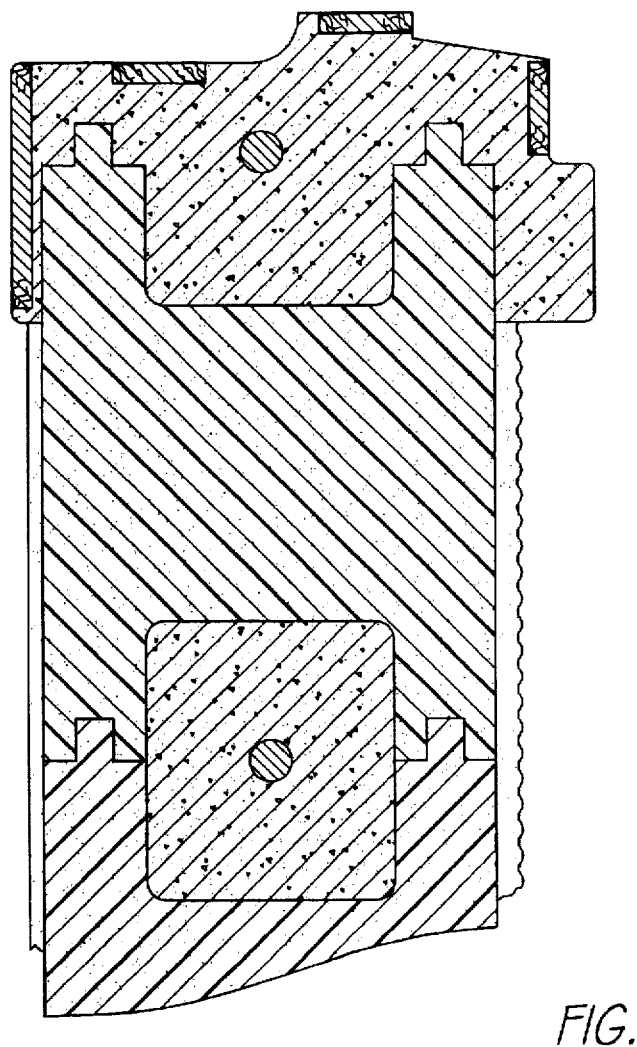

Turning now also to FIGS. 4 and 5, the PolyFRAME door or window framing system comprises a polyvinylchloride extrusion, of appropriate strength to resist deformation from the placement of concrete during the form wall filling process. The PolyFRAME extrusion may be cut to fit virtually any size required by the design for a window or door opening. The cut extrusion sections are placed in a welding frame and electronically welded, creating an interior and exterior, slide together, window or door surround frame. The PolyFRAME profile incorporates an exterior and interior ledge for the placement of hurricane shutters.

Depending on the anticipated strength of a pending hurricane two shutter surfaces can be mounted in each window. Additionally, there is virtually no maintenance over the life of the PolyFRAME as it cannot crack, chip or peal, virtually eliminating all work for the home or building owner.

Once the PolyFRAME window and door frames are installed and braced, the entire wall is plumbed and trued. An "H" frame profile is placed over the top course of PolyBLOC offering a protective tie down surface over the top of the wall. By attaching a "S" hook to the "J track clip" a tie down line is secured to both sides of the PolyBLOC wall at the "J" track. The tie down line is then pulled down tight, creating a downward force which will prevent the PolyBLOC from upward movement during the concrete placement process. At this time exterior bracing is placed from the top of the PolyBLOC wall to the ground. This brace incorporates a connecting member from the top course of the PolyBLOC wall to a large turn buckle. The turn buckle is anchored to a stack in the ground and the wall is then plumbed vertical via the turn buckle.

With the form wall properly secured and plumbed the placement of concrete may commence. The concrete is best placed by the use of a 2"-3" concrete pump. The concrete design mix for the form wall should be 4,000 p.s.i., pee gravel or "shot mix", 9" slump. The concrete is modified at the job site with the use of Fritz Chemical Slump enhancer. The appropriate amount of additive, based upon concrete volume, is placed in the ready mix truck and site blended for 5-8 minutes. The placement of concrete proceeds in a continuous lift by continual movement of the rolling scaffold form where the crew member directs the placement with a 2" pumping hose while he is moved by one or more additional pump crew members on the slab. Preferably, the forms of the present invention are pumped to full height, in continuous lifts, thus never causing a "cold joint".

Where high strength concrete is required by engineering design the concrete methods of the present invention can develop 6,000-10,000 p.s.i. concrete with ease. High strength concrete, while initially more costly, can prove to be the most cost effective material to use in many design/construction applications, as it develops a virtually fail proof structural construction material. Further, as high strength concrete is far less porous than standard concrete, greater protection is developed for the reinforcing steel disposed therein. The lower porosity does not allow salts and other destructive elements to penetrate into the material. These conditions are easily achieved with the PolyBLOC building system of the present invention.

Figure 3A:
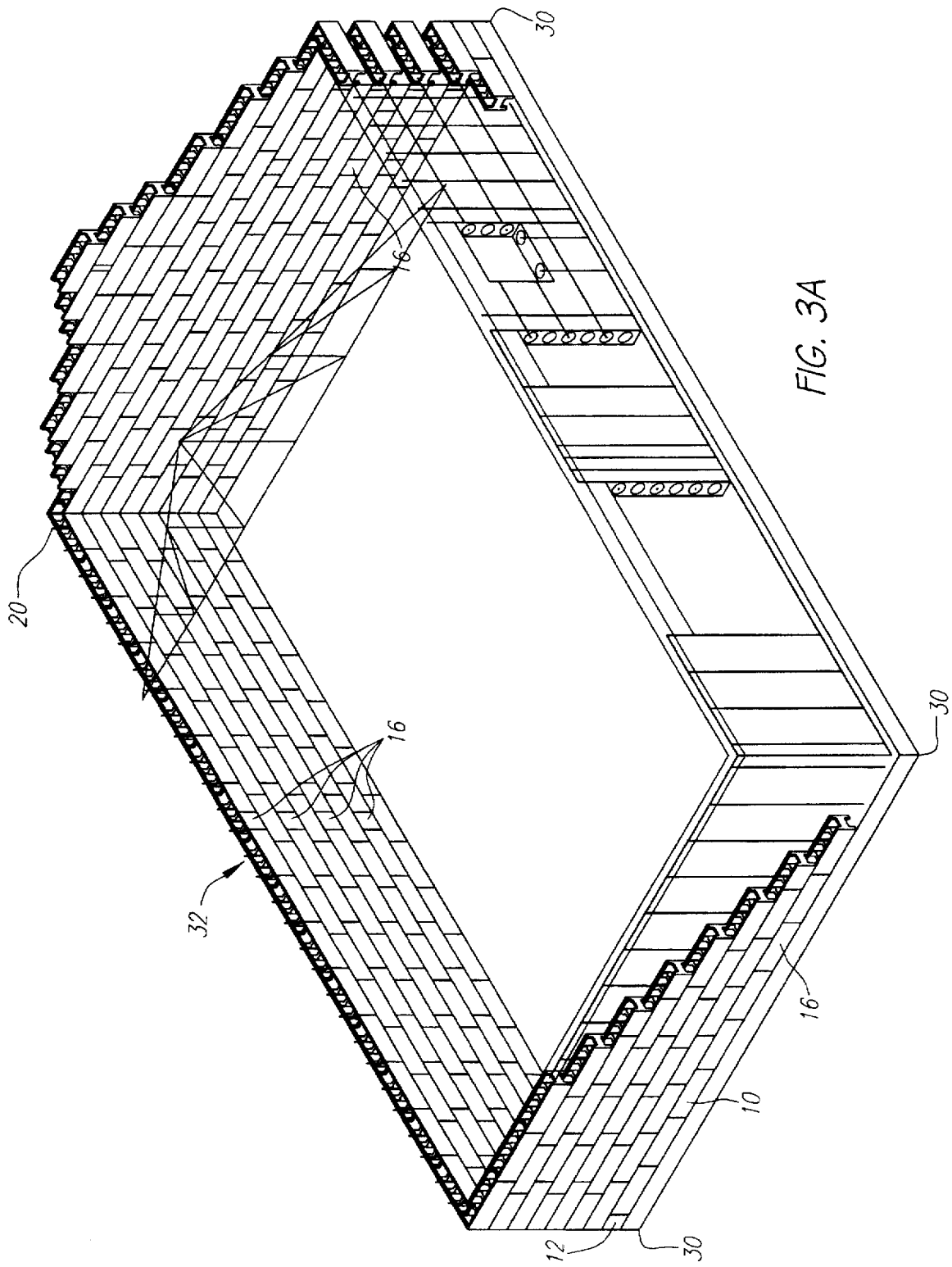
FIG. 3(a) illustrates an exterior structural shell formed of stay-in-place expanded polystyrene forms in accordance with the present invention.
Figure 3B:
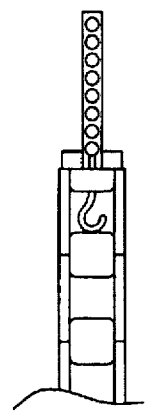
FIG. 3(b) provides an illustration of a typical tie beam, top plate "J" bolt and hurricane strap section of a wall.
Figure 3C:
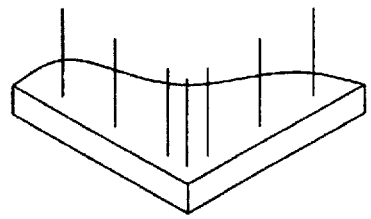
FIG. 3(c) illustrates typical rebar spacing and splicing in accordance with the present invention.
Figure 3D:
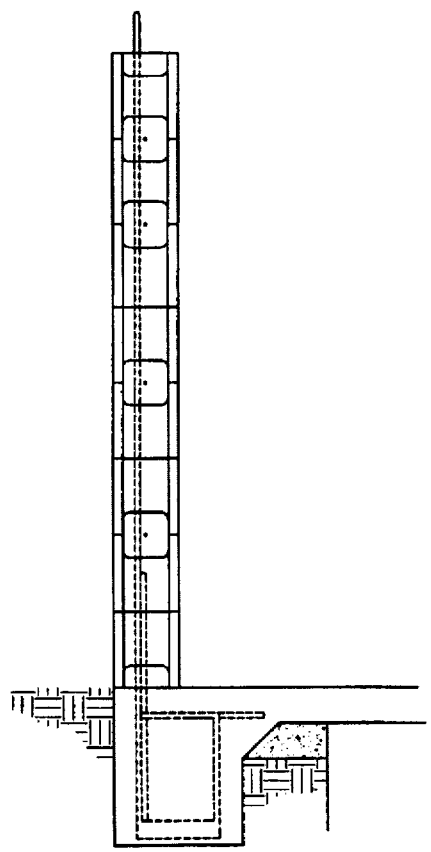
FIG. 3(d) provides an illustration of a wall and footer section.
Figure 3E:
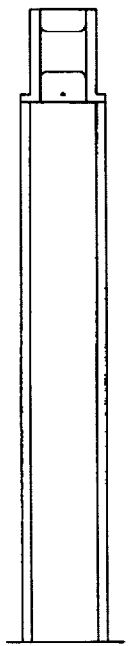
FIG. 3(e) provides an illustration of a wall at a door opening.
Figure 3F:
FIG. 3(f) provides an illustration of a cross-section of a wall at a window opening.

Upon the completion of the placement of concrete in the form walls, appropriate hurricane anchors, such as those shown in FIG. 3(b), are inserted into the wet concrete at the top course and allowed to remain so as to become mechanically attached in the concrete. These anchors are placed at the correct locations to allow the attachment of roof truss members to be mechanically affixed thereto. This greatly increases the ultimate uplift loading capacity of the structural members of a roof in accordance with the present invention.

Once the form walls have commenced their cure, approximately 12 hours, based upon nominal set time delay, the placement of exterior stucco can commence. PolyCOAT (manufactured by Sola Caribe, Inc. of Fort Lauderdale, Fla.) is an acrylic based bonding agent which, when properly mixed with a cementeous based exterior or interior stucco/plaster system, causes great bonding action to take place with the expanded polystyrene surface of the PolyBLOC (forms 10 and 12). Typical scratch coating surfacing is completed using the PolyCOAT and final finishing may continue upon the cure of the PolyCOAT modified scratch coating.

Interior wall finishing is achieved with conventional wall board (sheet rock). The wall board is mechanically fastened at the top and bottom of the PolyBLOC wall by screwing the wall board to the top and bottom PolyTRAC. The open field of the wall board can be glued to the PolyBLOC wall using PolyNAIL (manufactured by Sola Caribe, Inc. of Fort Lauderdale, Fla.). PolyNAIL is an adhesive, creating a non-removable bonding from virtually any material to the expanded polystyrene surface. PolyNAIL does not cause cavitation of the expanded polystyrene which is very common with most adhesive systems available for wall board.

Upon 24 hours of cure of the concrete placed in the PolyBLOC wall the placement the roof structural members may commence. The roof can then be finished per plan.

While the present invention is susceptible to various modification and alternative forms, specific examples thereof have been shown by way of example in the drawings and are herein described in detail. It should be understood, however, that it is not intended the limit the invention to the particular forms disclosed, but on the contrary, the invention is to cover all modifications, equivalents, and alternatives falling within the spirit and scope of the invention as defined by the appended claim(s).

What is claimed is:

1. A method for constructing a structure capable of withstanding substantial natural forces, said method comprising the steps of:

forming a slab foundation;

coupling a first plurality of "J" track supports to a perimeter section of said slab foundation;

coupling a second plurality of "J" track supports to said slab foundation, said second plurality of "J" track supports being parallel to and spaced a selected distance from said first plurality of "J" track supports;

setting a pair of bottom surfaces of a plurality of expanded polystyrene form blocks into said first and second plurality of "J" track supports to form a first course of said expanded polystyrene form blocks around said perimeter of said slab foundation;

stacking and coupling additional courses of said expanded polystyrene form blocks onto said first course of said blocks to form a shell of a wall around said perimeter of said slab foundation, said shell of said wall having a plurality of horizontal and vertical columns formed therein by said courses of said expanded polystyrene form blocks;

positioning steel reinforcing bars within said shell of said wall between said courses of said expanded polystyrene form blocks;

positioning steel reinforcing bars vertically at selected locations within said shell of said wall; and depositing in a continuous lift a selected amount of concrete into said horizontal and vertical columns within said shell of said wall, such that said horizontal and vertical columns of said shell of said wall are filled with concrete and such that no cold joints are formed within said concrete.

2. A method for constructing a structure such as a building which is capable of withstanding substantial natural forces, said method comprising the steps of:

forming a slab foundation;

coupling a first plurality of track supports to a perimeter section of said slab foundation;

coupling a second plurality of track supports to said slab foundation, said second plurality of track supports being parallel to and spaced inwardly a selected distance from said first plurality of track supports;

setting a pair of bottom surfaces of a plurality of expanded polystyrene form blocks into said first and second plurality of track supports to form a first course of said expanded polystyrene form blocks around said perimeter of said slab foundation;

stacking and coupling additional courses of said expanded polystyrene form blocks onto said first course of said blocks to form a shell of a wall around said perimeter of said slab foundation, said shell of said wall having a plurality of horizontal and vertical columns formed therein by said courses of said expanded polystyrene form blocks;

positioning steel reinforcing bars within said shell of said wall between said courses of said expanded polystyrene form blocks;

positioning steel reinforcing bars vertically at selected locations within said shell of said wall; and depositing in a continuous lift a selected amount of concrete into said horizontal and vertical columns within said shell of said wall, such that said horizontal and vertical columns of said shell of said wall are filled with concrete and such that no cold joints are formed within said concrete.

3. A method of supporting a base section of an expanded polystyrene block form to provide said base section with lateral support against hydrostatic pressure generated by concrete poured into said polystyrene block form and to prevent said concrete from seeping under said expanded polystyrene block form during pouring, said method comprising the steps of:

coupling at least one first track support to a section of a slab foundation;

coupling at least one second track support to said slab foundation, said second track support being parallel to and spaced a selected distance from said first track support; and setting a pair of bottom surfaces of said expanded polystyrene form block into said first and second track support.

4. The method of claim 3, wherein said first and second track supports are "J" track supports.

5. The method of claim 4, wherein said first and second track supports comprise a unitary dual track support.

\* \* \* \* \*